United States Patent
de Sedouy et al.

[11] Patent Number: 5,898,556
[45] Date of Patent: Apr. 27, 1999

[54] PROTECTION SYSTEM FOR A THREE-PHASE DISTRIBUTION TRANSFORMER INSULATED IN A LIQUID DIELECTRIC

[75] Inventors: Thomas de Sedouy, St Ouen De Thouberville; Philippe Folliot, Oissel, both of France

[73] Assignee: GEC Alsthom T & D SA, Paris, France

[21] Appl. No.: 08/825,743

[22] Filed: Apr. 3, 1997

[30] Foreign Application Priority Data

Apr. 4, 1996 [FR] France .................................. 96 04248

[51] Int. Cl.⁶ ........................................ H02H 5/04
[52] U.S. Cl. .............................. 361/37; 361/38; 361/35; 361/93
[58] Field of Search ................. 361/35, 37, 38, 361/41, 93, 99, 102, 104

[56] References Cited

U.S. PATENT DOCUMENTS

| | | | |
|---|---|---|---|
| 2,817,794 | 9/1957 | Amundson | 361/55 |
| 3,445,726 | 5/1969 | Allen | 361/37 |
| 3,666,992 | 5/1972 | Goodman | 361/39 |
| 3,916,259 | 10/1975 | Russell et al. | 361/41 |
| 4,002,949 | 1/1977 | Westrom | 361/41 |
| 4,223,364 | 9/1980 | Sangster | 361/37 |

FOREIGN PATENT DOCUMENTS

0653765A1  5/1995  European Pat. Off. .
3027564A1  3/1990  Germany .

*Primary Examiner*—Jeffrey Gaffin
*Assistant Examiner*—Kim N. Huynh
*Attorney, Agent, or Firm*—Sughrue, Mion, Zinn, Macpeak & Seas, PLLC

[57] ABSTRACT

A protection system for a three-phase distribution transformer immersed in a liquid dielectric contained in a tank, at least two of the three phases being equipped on the high voltage side of the transformer with respective current-limiting fuses. On each of the two phases equipped with current-limiting fuses, a protective micro-fuse is also connected in series with the current-limiting fuses and which operates faster than the current-limiting fuse. In addition, each micro-fuse is associated with a striker which, in turn, is connected to a mechanical trigger system which causes a three-phase short-circuiting device connected across the three phases to close in the event of a micro-fuse operating. Furthermore, the system includes at least one fault detector detecting one of pressure in the tank or the level of the dielectric. In particular, the three-phase short-circuiting device is situated on the high voltage side of the transformer between the current-limiting fuses and the high voltage windings.

5 Claims, 1 Drawing Sheet

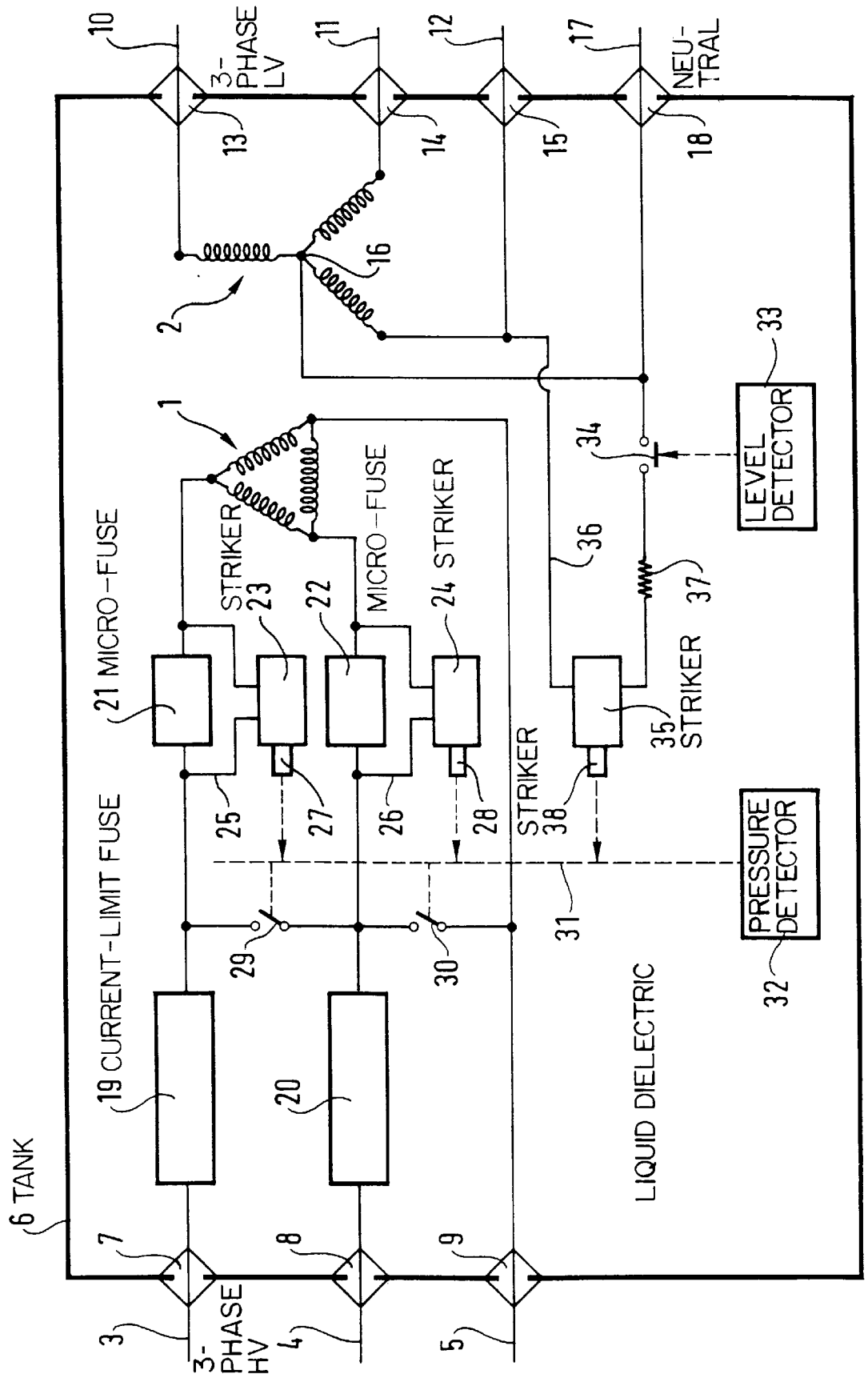

PROTECTION SYSTEM FOR A THREE-PHASE DISTRIBUTION TRANSFORMER INSULATED IN A LIQUID DIELECTRIC

FIELD OF THE INVENTION

The present invention relates to a protection system for a three-phase distribution transformer insulated in a liquid dielectric.

The invention applies in particular to distribution transformers situated in neutral-compensating networks, i.e. where the neutral of the star-connected secondary of the transformer of the source station is grounded through a reactance L tuned to the capacitance of the network so that in the presence of a ground fault, the fault current is theoretically nil.

BACKGROUND OF THE INVENTION

Should a fault occur in a liquid dielectric distribution transformer, there is a risk of the dielectric heating up and causing pressure rise to a level such that an explosion could occur, leading to serious consequences to the environment caused by the dielectric being sprayed about.

French patent No. 2 629 955 describes a device for protecting a three-phase transformer immersed in a liquid dielectric from a fault consisting in the dielectric liquid dropping to a predetermined level.

The device consists in that each phase is equipped, on its high voltage side, with a current-limiting fuse, and in that if the level of the dielectric drops, a float triggers an outright short circuit between a fourth contact connected to the mass of the transformer and a point in each phase situated between the fuses and the windings of the transformer.

However, in a neutral-compensating network, as was mentioned above, such a device is not satisfactory. Indeed, in the event of a fault (a drop in level such that the float establishes contact between the four points) there will be a three-phase short circuit connected to ground via the contact to mass, and only two of the fuses will blow with electricity continuing to pass through ground and the third phase which has not blown, at a current that is too low to operate the third fuse, but that is high enough either to trip the source station or else to heat the liquid dielectric, thus causing the pressure to rise and the tank to explode.

OBJECTS AND SUMMARY OF THE INVENTION

An object of the present invention therefore is to propose a reliable system which operates properly in a network, regardless of whether it is a neutral-compensating network or not.

The invention thus provides a protection system for a three-phase distribution transformer immersed in a liquid dielectric contained in a tank, at least two of the three phases being equipped on the high voltage side of the transformer with respective current-limiting fuses, said high voltage being insulated relative to the tank, wherein, on each of the two phases equipped with one of said current-limiting fuses, there is connected in series a protective micro-fuse, which operates faster than the current-limiting fuse, the micro-fuse being associated with a striker, and wherein the system includes at least one fault detection means concerning at least one of the two following points: pressure in the tank, and level of the dielectric, a three-phase short-circuiting device being situated on the high voltage between said current-limiting fuses and the high voltage windings, said short-circuiting device being controlled by said fault detection means, the striker associated with each micro-fuse also causing the short-circuiting device to operate in the event of the micro-fuse operating.

BRIEF DESCRIPTION OF THE DRAWING

An embodiment of the invention is described below with reference to the accompanying drawing, in which:

The sole FIGURE is a block diagram of a three-phase distribution transformer insulated in a liquid dielectric, and equipped with a protection system of the invention.

MORE DETAILED DESCRIPTION

By way of example the transformer is a 20 KV to 410 V transformer.

Numeral 1 designates the delta-connected high voltage winding and numeral 2 the star-connected low voltage winding. The high voltage winding 1 is fed by the three phases 3, 4, and 5 which penetrate into the transformer tank, shown here as rectangle 6, via respective insulating feedthroughs 7, 8, and 9.

The low voltage winding 2 feeds phase lines 10, 11, and 12 which pass through the tank 6 via insulating feedthroughs 13, 14, and 15, and in addition, the neutral 16 is connected to a neutral conductor 17 which passes through the tank via an insulating feedthrough 18.

On the high voltage side, two of the three phases, referenced here as phases 3 and 4, are connected to the high voltage winding 1 via respective current limiting fuses 19 and 20, whereas there is no fuse on the third phase, referenced 5. These fuses normally operate at above the current level referred to as the cut-off current Ic, e.g. 60 A. Below that value, there exists a critical current zone, e.g. in the range 36 A to 60 A, where the fuse heats up, deteriorates, and cuts off poorly. According to the invention, in order to protect the fuses from malfunctioning in this critical current zone, each current-limiting fuse 19 and 20 is connected in series with a respective micro-fuse 21 and 22, which is faster than the current-limiting fuse, and each of which is constituted by a short notched silver plate. Its role is to obtain melting at the bottom of the notch at low-level fault currents in the critical current zone of the current-limiting fuse, and to do so with good accuracy Each micro-fuse is associated with a respective striker 23 or 24.

Such a striker is a known device constituted by a pin under thrust from a spring held in the loaded position by a retaining steel wire. The steel wire, referenced 25, 26 is connected in parallel with the corresponding micro-fuse 21, 22. The steel wire of the striker has much higher electrical resistance than the silver plate of the micro-fuse, such that in normal operation the current flows through the silver plate thus avoiding aging the steel wire. In the event of excess current, in the calibrated zone corresponding to said critical zone, the silver plate melts causing an electric arc to appear, thus increasing the voltage across the terminals of the micro-fuse and diverting current to the steel wire, which melts, thus releasing the pin 27, 28 of the striker. This is the conventional mode of operation of a striker fuse.

The release of the pin of the striker causes a three-phase short-circuiting device 29, 30 to close. This command is implemented by any mechanical trigger system, as represented by dashed line 31. The system also includes a pressure detector 32 which likewise causes the short-circuiting device 29, 30 to operate in the event of the pressure of the dielectric exceeding the sensor set point. The protection device also has a level detector 33.

In the event of a drop below a given level, detector 33, e.g. constituted by a simple float, closes a contact 34, thus closing a circuit that includes a striker 35 whose steel wire 36 is connected between the neutral point 16 and one of the phases 12. A current-limiting resistor 37 is inserted in the circuit if necessary. The closing of the contact 34 causes a current to flow in the circuit which then causes the steel wire 36 of the striker 35 to melt, thus releasing its pin 38 and causing the three-phase short-circuiting device 29, 30 to close.

Thus, in the event of a fault appearing, such as excess current or excess pressure or a leak of dielectric leading to a drop below a predetermined level, an outright short-circuit is triggered between all three high-voltage phases 3, 4, and 5 at a point situated between the fuses 19, 20 and the high voltage winding 1, which immediately causes the fuses 19 and 20 to blow.

The micro-fuses 21 and 22 have no circuit-interrupting power and serve only to transform excess current into mechanical action, by means of the strikers 23, 24, in order to ensure that the short-circuiting device 29, 30 closes, thus causing the fuses 19, 20 to operate, which fuses do have circuit-interrupting power. The third phase 5, which is not interrupted remains live, but carries no current because no return is possible since both of the other phases 4 and 3 are open circuited.

In this transformer, the entire high voltage section is over insulated compared with the low voltage part of the tank. I.e. where other equipment in the network has insulation designed to withstand $\underline{x}$ KV relative to its mass, here the insulation is designed to withstand a higher voltage.

We claim:

1. A protection system for a three-phase distribution transformer immersed in a liquid dielectric contained in a tank comprising:

at least two of three phases being equipped on the high voltage side of the transformer with respective current-limiting fuses, said high voltage being insulated from the tank, wherein, on each of the at least two of three phases equipped with one of said current-limiting fuses there is connected in series a protective micro-fuse which operates faster than the current-limiting fuse and is associated with a striker which operates in the event that the micro-fuse operates, at least one fault detection means detecting at least one of a pressure in the tank and a level of the dielectric, a three-phase short-circuiting device being situated on the high voltage side of the transformer between said current-limiting fuses and high voltage windings of the transformer to short-circuit the phases together, said short-circuiting device being controlled by said at least one fault detection means and said striker associated with each micro-fuse.

2. The protection system according to claim 1, wherein said micro-fuse is a short notched silver plate.

3. The protection system according to claim 1, wherein said striker is electrically connected in parallel with said micro-fuse.

4. The protection system according to claim 1, said striker further comprising:

a pin;

a spring for providing a thrust force to said pin; and a retaining steel wire for holding said spring in a loaded position.

5. The protection system according to claim 4, further comprising:

said retaining steel wire having an electrical resistance higher than an electrical resistance of said micro-fuse; and said striker electrically connected in parallel to said micro-fuse by said retaining steel wire;

wherein when said micro-fuse opens a current flows in said retaining steel wire thereby causing said retaining steel wire to melt and release said spring which, in turn, thrusts said pin to control said three-phase short-circuiting device.

* * * * *